United States Patent
Jonsson et al.

(10) Patent No.: US 10,298,509 B2
(45) Date of Patent: May 21, 2019

(54) MANAGING A SEQUENCE NUMBER RANGE FOR RADIO LINK CONTROL ENTITIES IN A RADIO ACCESS NETWORK DURING AN ON-GOING CONNECTION

(71) Applicant: Telefonaktiebolaget LM Ericsson (publ), Stockholm (SE)

(72) Inventors: Anders Jonsson, Täby (SE); Gunnar Bergquist, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 268 days.

(21) Appl. No.: 15/035,278

(22) PCT Filed: Mar. 17, 2016

(86) PCT No.: PCT/SE2016/050221
§ 371 (c)(1),
(2) Date: May 9, 2016

(87) PCT Pub. No.: WO2017/160197
PCT Pub. Date: Sep. 21, 2017

(65) Prior Publication Data
US 2018/0115491 A1    Apr. 26, 2018

(51) Int. Cl.
*H04L 12/801* (2013.01)
*H04L 12/807* (2013.01)
(Continued)

(52) U.S. Cl.
CPC .............. *H04L 47/34* (2013.01); *H04L 1/187* (2013.01); *H04L 47/27* (2013.01); *H04W 28/02* (2013.01);
(Continued)

(58) Field of Classification Search
CPC ..... H04L 47/34; H04L 47/27; H04W 28/0257
See application file for complete search history.

(56) References Cited

U.S. PATENT DOCUMENTS 6,996,063 B2 * 2/2006 Jiang .................... H04L 1/1685
370/236
7,729,719 B2 * 6/2010 Bergstrom ............ H04L 1/1832
370/346
(Continued)

FOREIGN PATENT DOCUMENTS

WO    WO 2014204367 A1 * 12/2014 ............ H04W 74/06

OTHER PUBLICATIONS

3rd Generation Partnership Project, "3rd Generation Partnership Project; Technical Specification Group Radio Access Network; Evolved Universal Terrestrial Radio Access (E-UTRA); Radio Link Control (RLC) protocol specification (Release 13)", Technical Specification, 3GPP TS 36.322 V13.0.0, Dec. 1, 2015, pp. 1-44, 3GPP, France.
(Continued)

*Primary Examiner* — Tejis Daya
(74) *Attorney, Agent, or Firm* — Coats & Bennett, PLLC

(57) ABSTRACT

It is presented a method for managing a sequence number (SN) range for radio link control (RLC) entities in a radio access network (5) during an on-going connection. The method is performed in a transmitting node (4) of the radio access network and comprises the steps of: monitoring (60) send state variables for a transmission window; determining (61) to change the SN range based on the send state variables; and transmitting (62) a control message when the SN range is determined to change. It is also presented a transmitting node, a receiving node, a method performed in a receiving node, a computer program and a computer program product.

40 Claims, 5 Drawing Sheets

(51) Int. Cl.
*H04W 28/02* (2009.01)
*H04L 1/18* (2006.01)
*H04L 1/00* (2006.01)

(52) U.S. Cl.
CPC ....... *H04W 28/0257* (2013.01); *H04L 1/0035* (2013.01)

(56) References Cited

U.S. PATENT DOCUMENTS

| | | | | |
|---|---|---|---|---|
| 8,498,284 B2* | 7/2013 | Pani | ........................ | H04L 47/10 370/310 |
| 8,565,126 B2* | 10/2013 | Torsner | ................. | H04L 1/1621 370/278 |
| 9,246,638 B2* | 1/2016 | Jiang | ..................... | H04L 1/1685 |
| 9,900,798 B2* | 2/2018 | Bergquist | .............. | H04W 24/10 |
| 2002/0015385 A1* | 2/2002 | Yi | .......................... | H04L 1/1685 370/236 |
| 2002/0097809 A1* | 7/2002 | Jiang | ..................... | H04L 1/1809 375/295 |
| 2003/0125056 A1* | 7/2003 | Jiang | ..................... | H04L 1/1642 455/466 |
| 2004/0151154 A1* | 8/2004 | Wu | ........................ | H04L 1/1874 370/349 |
| 2006/0221833 A1 | 10/2006 | Jiang | | |
| 2009/0175206 A1* | 7/2009 | Wang | ..................... | H04L 1/1621 370/310 |
| 2009/0215456 A1* | 8/2009 | Chun | ..................... | H04W 72/10 455/435.1 |
| 2015/0003530 A1* | 1/2015 | Gao | ....................... | H04N 17/004 375/240.15 |
| 2015/0304061 A1* | 10/2015 | Gupta | ................... | H04J 3/0658 370/328 |
| 2015/0358479 A1* | 12/2015 | Sharma | ................. | H04M 15/65 455/406 |
| 2016/0150433 A1* | 5/2016 | Bergquist | .............. | H04W 24/10 370/328 |
| 2016/0261382 A1* | 9/2016 | Vajapeyam | ........... | H04L 1/1812 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Link Control (RLC) protocol specification (Release 12)", Technical Specification, 3GPP TS 36.322 V12.2.0, Mar. 1, 2015, pp. 1-40, 3GPP, France.

Ericsson; "Extending RLC protocol header"; 3GPP TSG-RAN WG2 Meeting #91bis; Malmö, Sweden; pp. 1-13; Change Request R2-154675.

* cited by examiner

| | | | | | |
|---|---|---|---|---|---|
| 0 | 001< CPT < 111 | R1 | R1 | R1 | R1 | Oct 1

Fig. 3B

| | | | | |
|---|---|---|---|---|
| 0 | 001< CPT < 111 | R1 | R1 | POSITION | Oct 1

Fig. 3C

| D/C | CPT | C/A | L/E | SN | Oct 1 |
|---|---|---|---|---|---|
| SN (cont.) | | | | | Oct 2 |
| SN (cont.) | | | | Window size | Oct 3 |

Fig. 3D

| D/C | CPT | C/A | L/E | PAD | Oct 1 |

Fig. 3E

| Value | Description |
|---|---|
| 00 | OFFSET_E = 10%, OFFSET_L = 15% |
| 01 | OFFSET_E = 25%, OFFSET_L = 20% |
| 10 | OFFSET_E = 75%, OFFSET_L = 25% |
| 11 | OFFSET_E = 90%, OFFSET_L = 75% |

Fig. 4

MANAGING A SEQUENCE NUMBER RANGE FOR RADIO LINK CONTROL ENTITIES IN A RADIO ACCESS NETWORK DURING AN ON-GOING CONNECTION

TECHNICAL FIELD

The invention relates to a method for managing a sequence number range for radio link control entities in a radio access network during an on-going connection, and a transmitting node, a receiving node, a computer program and a computer program product therefor.

BACKGROUND

The Layer 2 Radio Link Control, RLC, protocol for the Evolved Universal Terrestrial Radio Access, E-UTRA, or Long Term Evolution, LTE, radio standard is described in specification 3GPP TS 36.322 version 13.0.0. Methods for optimizing the RLC protocol in terms of overhead and enabling high bit rates (up to 25 Gbps) are currently being standardized in 3GPP.

The current RLC Sequence Number (SN) length defined for LTE of 10 bits is sufficient to support the peak data rates on RLC layer for legacy applications over early LTE implementations. However, LTE continuously evolves and has now extended its support to much higher peak rates using Carrier Aggregation of up to 32 LTE carriers with the resulting maximum peak rate support of 25 Gbps for which a 16 bits' SN length configurable may be used.

The throughput capacity of RLC is limited by the so called window stall phenomenon. This is the result of that the transmitting RLC entities are not allowed to send new RLC Protocol Data. Units (PDUs) and advance the RLC transmission window unless they have received RLC status reports at a sufficient rate. The maximum rate at which PDUs can be transferred is when the upper end of the RLC transmission window is reached at same time as the RLC status report for the lower end PDU is reached. The transfer of new PDUs will be suspended while such report is missing, and resumed when it arrives. The resulting intermittent transmission of application data due to the transmitting RLC entity periodically reaching the highest allowable SN in the window and temporarily ceasing transmissions clue to this limitation is termed an RLC window stall. The window size of LTE is defined as half the SN range, i.e. 512 in case of 10 bits' SN. The problem of RLC window stall is typically associated with Data Radio Bearers (DRBs) since data rates over Signalling Radio Bearers (SRBs) are practically much lower. However, in light of current 3GPP work for Data over Non-Access Stratum, DoNAS, a future may involve more frequent Service Data Units, SDUs, over SRB, and it might come to times when the present SN length used by RLC for SRBs may also come short with regards to the SDU rates associated to such transfer.

SUMMARY

It is an object of the invention to use an RLC SN range suitable to a data throughput level in order to avoid unnecessary RLC protocol overhead.

According to a first aspect it is presented a method for managing a sequence number (SN) range for radio link control (RLC) entities in a radio access network during an on-going connection. The method is performed in a transmitting node of the radio access network and comprises the steps of: monitoring send state variables for a transmission window; determining to change the SN range based on the send state variables; and transmitting a control message when the SN range is determined to change. By providing the transmitting node with the option to change SN range in dependence on utilization of SN range in the transmitting RLC entity, and by implementing the change through a control message, the throughput capacity of the transmitting RLC entity may be improved when high data throughput is needed, and a window stall is risked, the SN range can be increased. However, this will also increase control signalling and when window stall is no longer at risk, the SN range can therefore be decreased.

The step of monitoring may monitor a maximum send state variable, VT(MS), and a send state variable, VT(S). The step of determining may be based on a difference between the VT(MS) and VT(S).

The step of determining may be based on a currently used SN range.

The control message may be a control protocol data unit (PDU) message. The control PDU message may be contained in a control PDU type (CPT) field.

An increase offset may define an allowed least size of available transmission window before it is determined to increase the SN range, and a decrease offset may define an allowed greatest size of available transmission window before it is determined to decrease the SN range. The step of transmitting may comprise sending a control message for increase of the SN range when a difference of the send state variables are below the increase offset, and the step of transmitting may comprise sending a control message for decrease of the SN range when a difference of the send state variables are above the decrease offset.

The method may comprise the further steps of: increasing the SN range between delivery of a protocol data unit (PDU) with an SN of a maximum send state variable, VT(MS), reduced by the increase offset and delivery of a PDU with an SN of 0; and decreasing the SN range between delivery of PDU with an SN of VT(MS) reduced by the decrease offset increased by a decreased transmission window size and delivery of a PDU with an SN of 0.

The determining step may be based on (VT(MS)−VT(S)+(SN range)) MOD (SN range).

The control message may indicate a dedicated SN for performing an RLC reset.

The SN range may be changed between an SN length of 10 bits, e.g. [0, 1023], and 16 bits, e.g. [0, 65535].

The transmitting node may be a network node.

The transmitting node may be a wireless device.

According to a second aspect, it is presented a method for managing a sequence number (SN) range for radio link control (RLC) entities in a radio access network during an on-going connection. The method is performed in a receiving node of the radio access network and comprises the steps of: receiving a control message for change of the SN range; and changing the SN range. By providing the receiving node with the option to change SN range in dependence on utilization of SN range in the receiving RLC entity, and by implementing the change through a control message, the throughput capacity of the receiving RLC entity may be improved when high data throughput is needed, and a window stall is at risk, the SN range is increased. When window stall is no longer risked, the SN range is decreased thereby lowering protocol overhead.

The receiving node may be a network node.

The receiving node may be a wireless device.

According to a third aspect, it is presented a transmitting node for managing a sequence number (SN) range for radio link control (RLC) entities in a radio access network during an on-going connection. The transmitting node comprises: a processor; and a computer program product storing instructions that, when executed by the processor, causes the transmitting node to: monitor send state variables for a transmission window; determine to change the SN range based on the send state variables; and transmit a control message when the SN range is determined to change. By providing the transmitting node with the option to change SN range in dependence on utilization of SN range in the transmitting RLC entity, and by implementing the change through a control message, the throughput capacity of the transmitting RLC entity may be improved when high data throughput is needed, and a window stall is risked, the SN range can be increased. However, this will also increase control signalling and when window stall is no longer at risk, the SN range can therefore be decreased.

According to a fourth aspect, it is presented a receiving node for managing a sequence number (SN) range for radio link control (RLC) entities in a radio access network during an on-going connection. The receiving node comprises: a processor; and a computer program product storing instructions that, when executed by the processor, causes the receiving node to: receive a control message for change of the SN range; and change the SN range. By providing the receiving node with the option to change SN range in dependence on utilization of SN range in the receiving RLC entity, and by implementing the change through a control message, the throughput capacity of the receiving RLC entity may be improved when high data throughput is needed, and a window stall is risked, the SN range is increased. When window stall is no longer at risk, the SN range is decreased thereby lowering protocol overhead.

According to a fifth aspect, it is presented a transmitting node for managing a sequence number (SN) range for radio link control (RLC) entities in a radio access network during an on-going connection. The transmitting node comprises: a monitoring manager configured to monitor send state variables for a transmission window; a determination manager configured to determine to change the SN range based on the send state variables; and a communication manager configured to transmit a control message when the SN range is determined to change.

According to a sixth aspect, it is presented a receiving node for managing a sequence number (SN) range for radio link control (RLC) entities in a radio access network during an on-going connection. The receiving node comprises: a communication manager configured to receive a control message for change of the SN range, and configured to change the SN range.

According to a seventh aspect, it is presented a computer program for managing a sequence number (SN) range for radio link control (RLC) entities in a radio access network during an on-going connection. The computer program comprises computer program code which, when run on a processor of a transmitting node in the radio access network, causes the transmitting node to: monitor send state variables for a transmission window; determine to change the SN range based on the send state variables; and transmit a control message when the SN range is determined to change.

According to an eighth aspect, it is presented a computer program for managing a sequence number (SN) range for radio link control (RLC) entities in a radio access network during an on-going connection. The computer program comprises computer program code which, when run on a processor of a receiving node in the radio access network, causes the receiving node to: receive a control message for change of the SN range; and change the SN range.

According to a ninth aspect, it is presented a computer program product, comprising a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, on which:

FIGS. 3A-3E are schematic diagrams for PDU messages;

FIG. 4 is a table of change conditions according to an embodiment presented herein;

DETAILED DESCRIPTION

Figure 1:
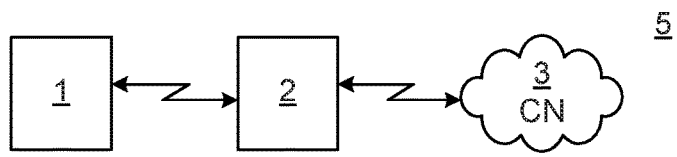
FIG. 1 is a schematic diagram illustrating an environment where embodiments presented herein can be applied.

The invention will now be described more fully with reference to the accompanying drawings, on which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description and drawings.

The 3GPP standardization partnership has introduced support and option to use more bits to define the Radio Link Control (RLC) Sequence Number (SN) length in acknowledged mode, where currently always 10 bits are used. While this reduces the risk of RLC window stall, it also means that the RLC header is extended by at least one octet. The current 10 bit RLC SN length is quite adequate for most cases and longer RLC SN length is seldom needed. Consequently, the 3GPP standard may provide means to configure either 10 bits or a longer RLC SN at the setup of a new Data Radio Bearer (DRB). Furthermore, by acknowledging the fact that throughput requirements may change, the 3GPP standard has been improved to provide means to reconfigure such a DRB to and from both 10 and the longer RLC SN of 16 bits. The currently discussed method for both, i.e. to configure and also to reconfigure, uses Radio Resource Control (RRC) signalling. While the use of RRC signalling comes with no additional cost to configure SN length, there are a number of disadvantages of using RRC signalling for re-configuring the SN length.

First of all, RRC signalling and internal network signalling are too slow as compared to how fast demand and supply of throughput may change. This can be concluded from today's LTE mobile broadband networks, where a vast range of divergent application types are treated with the same best effort Quality of Services, QoS. This means that packets from e.g. delay-tolerant phases of applications which during lengthy times exchange only very small amounts of data will coexist alongside occasional bursts of packets from rare phases that could benefit from the larger rates and increased throughput over RLC that the longer SN provides. A change of required or available throughput will first need to be detected, then processed, internally agreed and communicated within the network parts, before finally the RRC procedure to reconfigure the SN length may start. Moreover, the RRC signalling itself comes with a large bulk of overhead that may serve no other purpose than to reconfirm a full configuration, the majority part of which has nothing to do with a change of RLC SN length. It is also noted that such overhead and preparation time do not scale with the throughput demand but stay fixed also when the demand grows larger.

Secondly, such additional signalling puts an additional burden on the resources required for transmission, which not only increases the signalling overhead but also increases the risk of dropped calls due to signalling failure.

A solution is presented to detect and change the RLC SN length by means of RLC in-band detection and control as opposed to a method which requires RRC signalling and also internal network discovery and signalling with the core network to achieve the same result. A method is presented which detects RLC window stall or the risk of an RLC window stall by means of monitoring the RLC window fill level. Embodiments utilizing an in-band control message are presented.

The presented solution has the advantage that it is quicker than RRC signalling and can further be achieved with less protocol overhead. The presented solution eliminates the risk of losing a call as a result of Radio Link Failure, RLF, which can occur when attempting to transmit a large RRC reconfiguration message in bad coverage situations or at high load when network resources have grown scarce.

A first example illustrates problems associated with a limited SN range.

With an SN length of 10 bits, SN is coded in 10 bits, so that an SN range may be $0 \ldots 2^{10}-1$, i.e. $0 \ldots 1023$. A transmission window is in LIE half the SN length, i.e. 512.

A single user has a full transmission window buffer N=512 and an RLC SDU rate of R=1000 SDUs per second (the user is scheduled with new data every Transmission Time Interval TTI=1 ms in LTE).

A window stall will occur after utilization of half the SN range i.e. when N=512 or more. AN SN is considered utilized when acknowledgments, ACKs, of transmissions are missing. When an ACK is received, the SN is no longer considered utilized. The acknowledged mode (AM) RLC, according to 3GPP, is used.

When the user is continuously scheduled new data, e.g. at each TTI, a very concrete problem will occur at an outage where T>N/R=512/1000, i.e. already at ~0.5 seconds. The throughput at lower protocol layers depends on the configuration of the physical layer and also on external circumstances under which the physical layer throughput must work. The physical layer may be configured for multiple input multiple output, MIMO, possibly using 2 transport blocks per TTI, and may further use a multitude of MIMO layers allowing larger sizes of transport blocks. External circumstances may e.g. include the user being close or far away from a base station, with a radio path either in a line-of-sight or shadowed by obstacles in the terrain, thereby calling for more or less robust modulation and coding schemes. However, the physical layer configuration may not be decisive for how fast RLC SN runs through a transmission window of 512 in the case of an outage. The scheduler and the Media Access Control layer act as an adaptation layer and RLC just follows what data size is granted using segmentation and concatenation of incoming/buffered data. It may be equally important (or more) how often the user is scheduled. With a full buffer, the channel quality can be poor and only 10 bytes are scheduled every ms, or the channel quality can be excellent and the maximum throughput of the radio interface is used. In a similar way, nor do the bit rates and throughput which are measured at layers on top of the RLC protocol layer, such as the Packet Data Convergence Protocol layer, and Internet Protocol, IP, layer etc. on top of that, deter nine how fast the RLC will wrap around in the outage case. Instead, it may be important whether data is present in the transmission buffer and how often the RLC entity is allowed to transmit (once per TTI or more seldom). When the RLC entity transmits, and if the transmission buffer is not empty, it will put new data in a PDU and increment the SN.

In another example there is no outage but still 10 bits' SN length is not enough. Instead of a complete outage making SN run through a transmission window of 512, the transmission window will stall clue to the pace at which ACKs are returned. The pace is determined by the following. There is a first delay before the receiver receives a PDU, a second delay before the receiver is allowed to send. ACK (status prohibit time), a third delay until the receiver has received a grant to transmit a response (scheduling request) and fourth delay before the transmitter receives the ACK in response. The maximum rate that can be achieved using 10 bits SN given such constraints in delay is approximately 3.7 to 5.2 Gbps depending mainly on some parameters in the configuration of RLC. The calculation is done with a 25 ms RLC Round Trip Time (RTT) and with a channel where e.g. sizes of SDUs can be maximized.

However, an efficient transition between high and low bit rate scenarios is presented. A fast way to switch from the RLC SN range supporting 3.7 to 5.2 Gbps which is the RLC window stall limit with 10 bit SN length to the RLC SN range supporting all the way up to a maximum of 25 Gbps with 16 bit SN range when needed, and then quickly with minimal overhead switch back from the extended 16 bit RLC SN range to the lower 10 bit RLC SN range when the extended 16 bit RLC SN range is no longer needed. The switching may be based on throughput need or alternatively be based on possible/not possible to achieve the extended 16 bit RLC SN range. Even though 10 and 16 bit RLC ranges are presented herein, change between other RLC SN ranges are also possible.

An advantage with an in-band method for changing the RLC SN range as presented herein, compared to RRC signalling, is that the presented method is faster and requires less overhead, i.e. less bandwidth for a given data throughput. With the presented method a minimal amount of data can be piggybacked on an RLC PDU that was scheduled to be transmitted anyway.

Further, the rate of RLF is directly proportional to the amount of RRC signalling, and an increase in the volume of RRC signalling due to utilizing this to change RLC SN range will invariably lead to an increase in RLF frequency.

Send state variables related to RLC data transfer with a 10 bit SN range may take values from 0 to 1023. With a 16 bits SN range the values may be from 0 to 65535. The term SN range defines the range or space of values which the SN may take, and may alternatively be termed SN space. An out-of-range SN will be treated as an error at a receiving end.

Some terms, variables and constants e.g. used in 3GPP TS 36.322 are next repeated to define their meaning.

VT(A) and VR(R) are modulus bases at the transmitting side and receiving side of an AM RLC entity, respectively. The modulus base is subtracted from all the values involved, and then an absolute comparison is performed. With e.g. 10 bits SN length, VR(R)≤SN<VR(MR) is evaluated as [VR(R)−VR(R)] mod 1024≤[SN−VR(R)] mod 1024<[VR(MR)−VR(R)] mod 1024. In this expression, the variables are defined as follows.

VT(S) is the send state variable of 3GPP TS 36.322, which holds the value of the SN to be assigned for the next newly generated PDU. It is initially set to 0, and is incremented whenever the transmitting RLC entity sends a PDU with SN=VT(S).

VT(MS) is the maximum send state variable of 3GPP TS 36.322, which serves as the upper end of the transmitting window.

VT(A) is the acknowledgement state variable of 3GPP TS 36.322, which holds the value of the SN of the next PDU for which a positive acknowledgment is to be received in-sequence. As such it serves as the lower end of the transmitting window. It is initially set to 0, and is updated whenever the transmitting RLC entity receives a positive acknowledgment for a PDU with SN=VT(A). The upper end VT(MS) is calculated from VT(A)+AM_Window_Size.

VR(R) is the receive state variable of 3GPP TS 36.322, which holds the value of the SN following the last in-sequence completely received AM Data, AMD, PDU. As such it serves as die lower end of the receiving window. It is initially set to 0, and is updated whenever the receiving AM RLC entity receives an AMD PDU with SN=VR(R).

VR(MR) is the maximum receive state variable of 3GPP TS 36.322, which serves as the upper end of the receiving window. It equals VR(R)+AM_Window_Size and holds the value of the SN of the first AMD PDU that is beyond the receiving window.

AM_Window_Size is constant in 3GPP TS 36.322 and set to half the SN range, i.e. 512 for 10 bits SN length, or 32768 for 16 bit RLC SN length. AM_Window_Size_S is a constant related to the smaller SN range, e.g. the AM_Window_Size 512 defined for 10 bits SN length in 3GPP TS 36.322.

VT(MS) and VT(S) are as described above known from 3GPP 36.322. As such arithmetic operations VT(MS)−VT(S)<OFFSET_E and VT(MS)−VT(S)>OFFSET_L are affected by the AM modulus base, i.e. final value=[value from arithmetic operation] modulo 1024 for 10 bit SN length and 65536 for 16 bit SN length.

OFFSET_E is either a constant known to both transmitting and receiving RLC entities, e.g. defined by a protocol specification, or a variable that can be configured per RLC entity mapped to a radio bearer, e.g. by another RLC in-band control message. The OFFSET_E defines a buffer in SN range before a larger SN range is required.

OFFSET_L is a constant or a variable with similar characteristics as OFFSET_E but instead defines a buffer in SN range before a smaller SN range can be used.

The OFFSET_L and OFFSET_E thresholds provide the added benefit of a hysteresis range thereby avoiding frequent and unwarranted changes of RLC SN range.

The transmitting side of an RLC entity may use a method that comprises the following.

Continuously monitoring the maximum send state variable VT(MS) and the send state variable VT(S) related to RLC Acknowledged Mode, AM, data transfer, in particular detecting when to start or stop using a larger SN range. In dependence of these variables the SN range is then maintained, increased or decreased.

An entering condition for increasing the SN range may be VT(MS)−VT(S)<OFFSET_E, i.e. less than OFFSET_E away from the upper end of the transmission window. A leaving condition for decreasing the SN range may be VT(MS)−VT(S)>OFFSET_L, i.e. larger than OFFSET_L away from the upper end of the transmission window.

The length of the SN range configured by the RLC entity may have a default value to be used for setting an SN of AM Data. (AMD) PDUs and state variables when no other value has been concluded.

Committing to a larger SN range, i.e. changing the SN range, may be made at the earliest at the delivery of the PDU with SN=VT(MS)−OFFSET_and at the latest at the delivery of the PDU with SN=0 that follows, i.e. immediately when moving into the entering condition or at least before it is absolutely needed such as when passing the upper end of the SN range at which the SN range wraps around, without restarting a modulus base (VT(A)) thereof, i.e. without resetting the acknowledgement state and send state variables.

Committing to a smaller SN range, i.e. changing the SN range, may be made at the earliest at the delivery of the PDU with SN=VT(MS)−OFFSET_L+ a decreased window size, AM_Window_Size_S, and at the latest at the delivery of the next PDU with SN=0 that follows, i.e. as soon as possible after having moved into the leaving condition or at least before it is absolutely needed, such as when passing the upper end of the SN range at which it wraps around, but first allowing a full round of the smaller SN range to occur, thus avoiding duplicate use of the same SN, then restarting a modulus base VT(A) thereof, i.e. resetting acknowledgements and send state variables thereof.

Committing to a change in SN range may use a synchronized RLC reset procedure. By transmitting a control message to the receiving RLC entity to convey information at which SN the change by reset shall occur. When executing the synchronized RLC reset, the RLC entity resets its own send state variables and instructs the receiving RLC entity to reset its RLC send state variables, and to reassemble any completely received RLC SDUs, and to then flush any remaining stored RLC PDUs from the reception buffer and to send an acknowledgement PDU in return.

The receiving side of an RLC entity may use a method that comprises the following.

The length of the SN range configured by the RLC entity may have a default value to be used for setting an SN of AMD PDUs and state variables when no other value has been concluded.

Committing to a change in SN range may use a synchronized RLC reset procedure. By receiving a control message indicating information at which SN value the change by reset shall occur. When executing the synchronized RLC reset, the RLC entity resets its own send state variables and reassembles any completely received RLC SDUs, and then flushes any remaining stored RLC PDUs from the reception buffer and sends an acknowledgement PDU in return.

FIG. 1 schematically illustrates an environment wherein embodiments of the solution presented herein can be implemented. A wireless device 1 is in connectivity with an evolved node B (eNB) 2, in turn connected to a core network 3 of a radio access network, all being part of a radio access network 5.

The transmitting and receiving RLC entities as described herein can either be located in a wireless device, such as a User Equipment (e.g. a mobile phone or a laptop computer equipped with a mobile broadband adapter) a terminal device, a connected sensor, or a connected metering device, or in network node, such as an eNB as part of a network node in a radio access network. Each RLC entity actually comprises both a transmitting side and a receiving side, and communication described herein is between two different RLC entities communicating from a transmitting side of one RLC entity to a receiving side of another RLC entity.

Figure 2A:
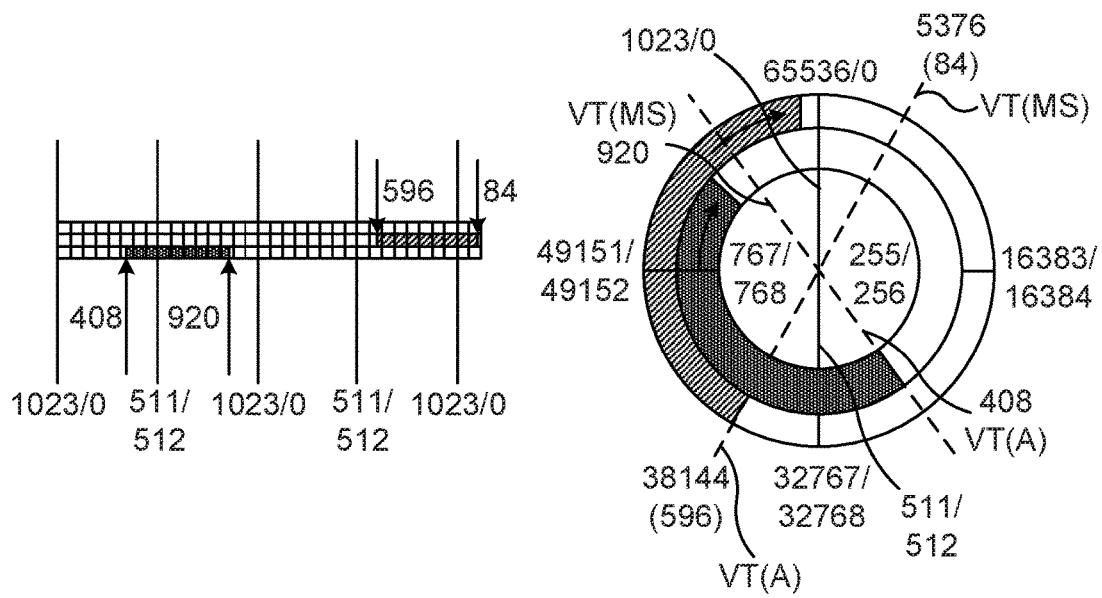
FIGS. 2A-2D are schematic diagrams illustrating transmission windows for an RLC entity.

FIG. 2A schematically illustrates two positions of a transmission window for an RLC entity, both linearly and circularly. A first transmission window is shown in dashed lines between 408 and 920 in a 10 bit SN range. A second transmission window is shown in crossed lines between 596 and 84 (wrapped) in a 10 bit SN range. Correspondingly, illustrated circularly only, the second transmission window is shown in crossed lines between 38144 and 5376 (wrapped) in a 16 bit SN range.

Figure 2B:
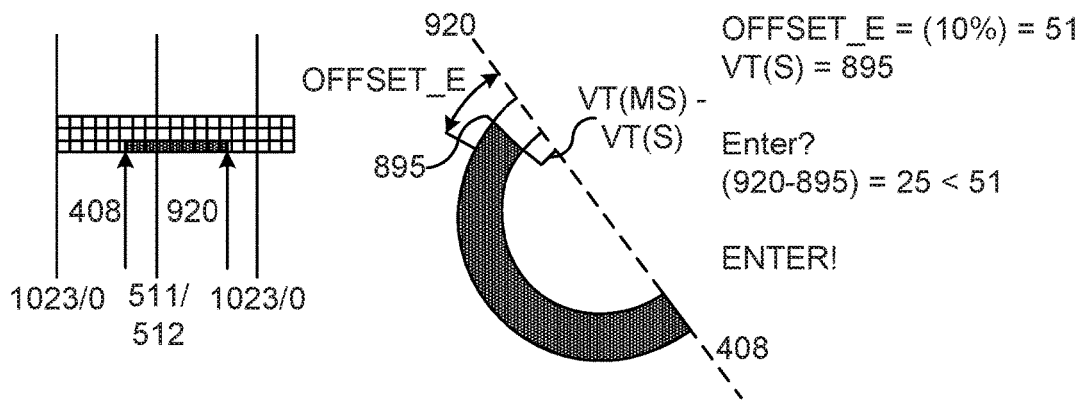
Figure 2C:
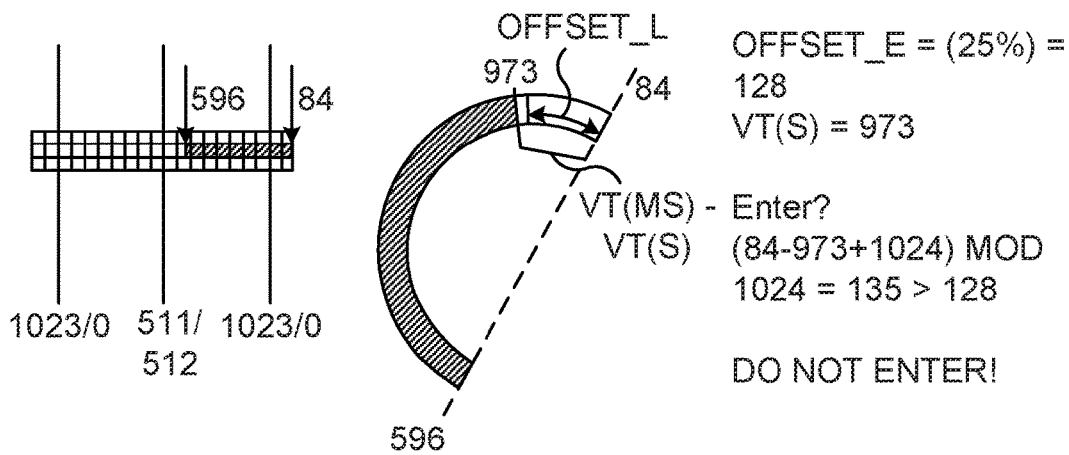
Figure 2D:
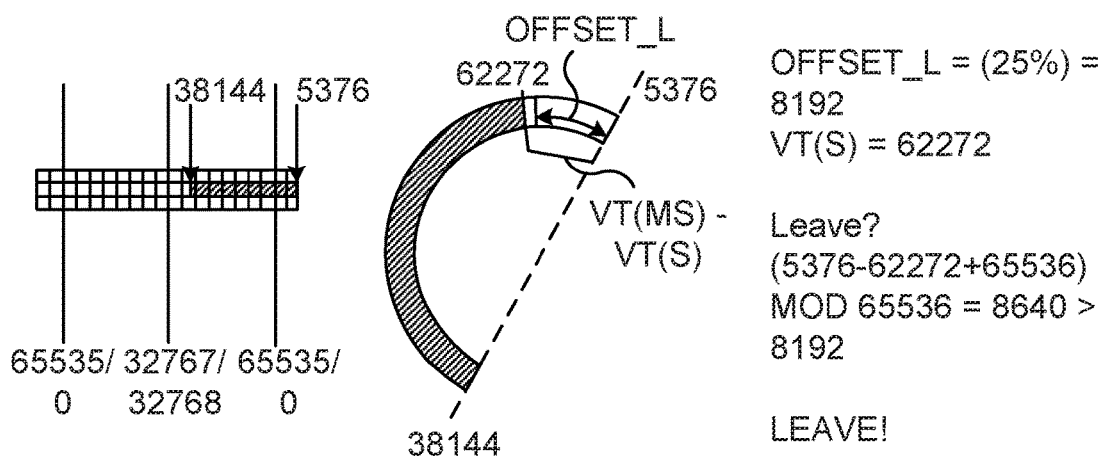

FIG. 2B schematically shows an enter condition that is true, for 10 bit SN length, for the first transmission window shown in FIG. 2A. With the enter condition true, a change to an extended 16 bit SN length should be initiated. FIG. 2C schematically shows an enter condition that is false, for 10 bit SN length, for the second transmission window shown in FIG. 2A. With the condition false, no change to an extended 16 bit SN length should be initiated. FIG. 2D schematically shows an enter condition that is true, for 10 bit SN length, for the second transmission window shown in FIG. 2A.

The control message sent from the transmitting node is used by the transmitting side of an AM RLC entity to inform the receiving AM RLC entity about the change in SN length, and optionally when that change shall occur. The transmitting node is both transmitting and receiving signalling, e.g. receiving acknowledgements, but is the node transmitting payload data. Correspondingly, a receiving node is both transmitting and receiving signalling, e.g. transmitting acknowledgements, but is the node receiving payload data. A wireless device is thus a transmitting node in an uplink communication with a base station, and a receiving node in a downlink communication. Correspondingly, the base station is thus a transmitting node in a downlink communication with the wireless device, and a receiving node in an uplink communication with the wireless device.

Figure 3A:
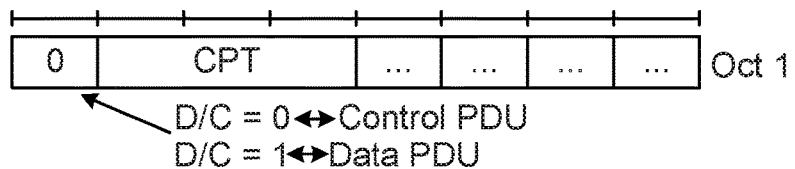

The control message may use an RLC control PDU. The general format used for the first byte of an RLC Control PDU in standard 3GPP 36.322 is shown in FIG. 3A.

The D/C field is set to 0 to indicate RLC control PDU. Further, the CPT field indicates the type of RLC control PDU. The CPT value 000 (decimal 0) is already used by 3GPP standard to indicate the STATUS PDU sent by the receiving side of an RLC entity. Any of the CPT reserved values 001-111 (decimal 1-7) can be used for the control message presented herein. The 4 additional bits, marked R1, are reserved as illustrated in FIG. 3B.

In an embodiment presented herein, 2 of the 4 additional bits of the control PDU, marked R1 in FIG. 3C, are used to define a brief range of one POSITION parameter which RLC entities may use to set both OFFSET_E and OFF-SET_L.

In another embodiment, the 2 additional bits, marked R1 in FIG. 3C, that are left using 2 bits for the POSITION parameter, may be used to indicate the receiving RLC entity to perform, and optionally when to perform, an RLC reset or as an acknowledgement of the reception of such a control PDU. As an example, the first R1 bit may be sent by the transmitting RLC entity to indicate the receiving RLC entity to perform a reset while the transmission in the opposite direction of the second R1 bit by the receiving RLC entity to the transmitting RLC entity indicates that the receiving RLC entity has received the RLC reset indication and has initiated an RLC reset procedure.

In an example illustrated in FIG. 4, a table with a set of different values for OFFSET_E and OFF-SET_L is shown. The percentage % calculations apply to a buffer portion of the SN range. The OFF-SET_E and OFFSET_L are thus defined in terms of a percentage part of the current AM_Window_Size. An OFFSET_E=10% may be used when the network is controlled to use a generous budget for its resources, i.e. use the larger SN range for any flow of packets that occasionally may benefit from an almost immediate introduction of the enlarged throughput that comes with it. An OFFSET_E=90% may be used when the network is controlled to use a tighter budget for its resources, e.g. when the packets in a flow are scarce and small or packet flow lengths are short, and therefore only allow the use the larger SN length when it has larger opportunities to provide a throughput benefit for an ongoing packet flow.

In order to facilitate an in-band RLC PDU controlled change of RLC window size, a new type of RLC control PDU needs to be introduced to the 3GPP TS 36.322 version 12.2.0.

Consequently, to reflect the improvement provided herein, section 6.2.2.13 may be modified with a new field value, such as 001, to introduce a new Control PDU Type, such as RLC SN range PDU. Other reserved bits 010 to 111 may be used for indicating the request and acknowledgement of the change of RLC SN range, and the use of 001 above to map to die new control PDU is just one example of a possible mapping.

The change of RLC SN range may be achieved by means of a synchronized change in which both the initiating and receiving RLC entity agree at which specific RLC SN the change shall occur.

A synchronized change has the advantage that the transition is done in a coordinated manner where both the transmitting and receiving RLC entity commit to the new RLC SN range at the same RLC SN, and consequently the risk of uncoordinated RLC windows is much eliminated. However, the overhead is higher since it first requires signalling. Moreover, the control PDU used to instruct the receiving RLC entity to change RLC SN range must be large enough to include information that indicates at which RLC SN the change shall occur, illustrated in FIG. 3D as a control PDU using two octets.

Utilization of low protocol overhead, as illustrated in FIG. 3E, is advantageous since both the initiation and the acknowledgement can be achieved with a control PDU using one single octet, while the disadvantage is that there is a risk that the transmitting RLC entity transmits RLC PDU that are outside the RLC window or that the receiving RLC entity requests retransmissions of RLC PDUs that are outside the transmitting RLC entities send window. The acknowledgement may either be just 1 octet to confirm reception of the transmitting side's RLC SN change control PDU, or also as an additional precaution contain the SN as well which is advantageous in case multiple RLC SN change control PDUs are sent in short succession by the transmitting RLC entity.

The format of the control PDU to control the change of the RLC window size as described above can be added as a new section in 3GPP. The RLC control PDU format will be different depending on if synchronized change is used or not.

Using a control message with explicit SN at which change shall occur is illustrated in FIG. 3D.

The RLC SN range PDU consists of an RLC SN range PDU payload and an RLC SN range PDU header. The RLC SN range PDU header consists of a D/C and a CPT field.

The RLC SN range PDU payload starts from the first bit following the RLC control PDU header. The first C/A bit indicates if the PDU is a command or acknowledgement PDU. The next L/E bit indicates if the 10 or 16 bit RLC SN range should be used while the following 16 bits defines from which SN the indicated RLC window size shall be used. The final 2 bits are a map determining how large the RLC window size shall be in relation to the RLC SN range indicated in the preceding 16 bits.

Many different mappings are possible, one possible mapping is that the C/A bit 1 is for command and 0 for acknowledgement and that L/E bit mapping 0 is 10 bit and 1 indicates 16 bit RLC SN range. Likewise, the 2 bits that indicate RLC window size may be mapped as follows: 0 indicates that the RLC window size is the same as the RLC SN range while 1 indicates that the RLC window size shall be half the RLC SN range and the 2 other mappings may be used for other window size alternatives. Alternatively, only one bit is used for conveying window size and the other two bits are reserved for future use.

In an embodiment the RLC SN range PDU may either include the RLC window size to use explicitly or that the RLC window size could alternatively be implicitly understood to be half the RLC SN range indicated in the RLC SN range PDU. Yet another alternative would be to use two CPT fields for RLC window size control, one for command and one for acknowledgement to save the C/A bit.

Using a control message without explicit SN at which change shall occur is illustrated in FIG. 3E.

The RLC SN range PDU consists of an RLC SN range PDU payload and an RLC SN range PDU header. RLC SN range PDU header consists of a D/C and a CPT field.

The RLC SN range PDU payload starts from the first bit following the RLC control PDU header. The first C/A bit indicates if the PDU is a command or acknowledgement PDU. The next L/E bit indicates if the 10 or 16 bit RLC SN range should be used. The last 2 bits are padding bits or reserved for future use.

Figure 5:
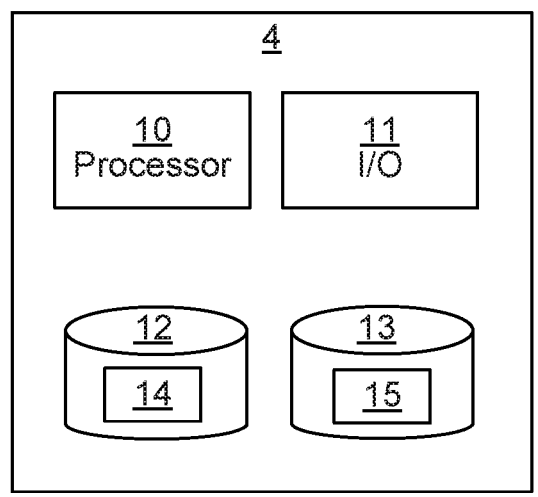
FIG. 5 is a schematic diagram illustrating some components of a node.

FIG. 5 is a schematic diagram showing some components of the transmitting node 4, generically numbered 4 for the wireless device 1 or the eNB 2. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIGS. 6A-6B.

The memory may be any combination of read and write memory (RAM) and read only memory (ROM). The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory (RAM) and read only memory (ROM) and may also comprise persistent storage, which, for example, can be any single one or combination of magnetic memory, optical memory, solid state memory or even remotely mounted memory. The data memory may e.g. hold other software instructions 15, to improve functionality for the transmitting node 4.

The transmitting node 4 may further comprise an input/output, I/O, interface 11 including e.g. a user interface. The transmitting node may further comprise a transmitter configured to transmit signalling to a receiving node. Other components of the transmitting node are omitted in order not to obscure the concepts presented herein.

Figure 6A:
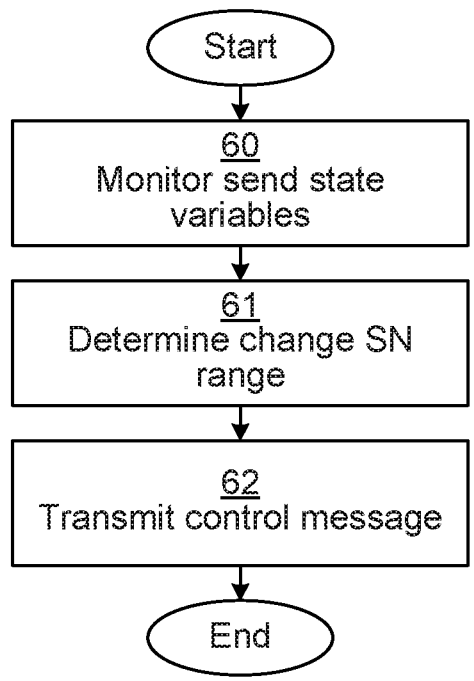
FIGS. 6A-6B are flow charts illustrating methods for embodiments presented herein.
Figure 6B:
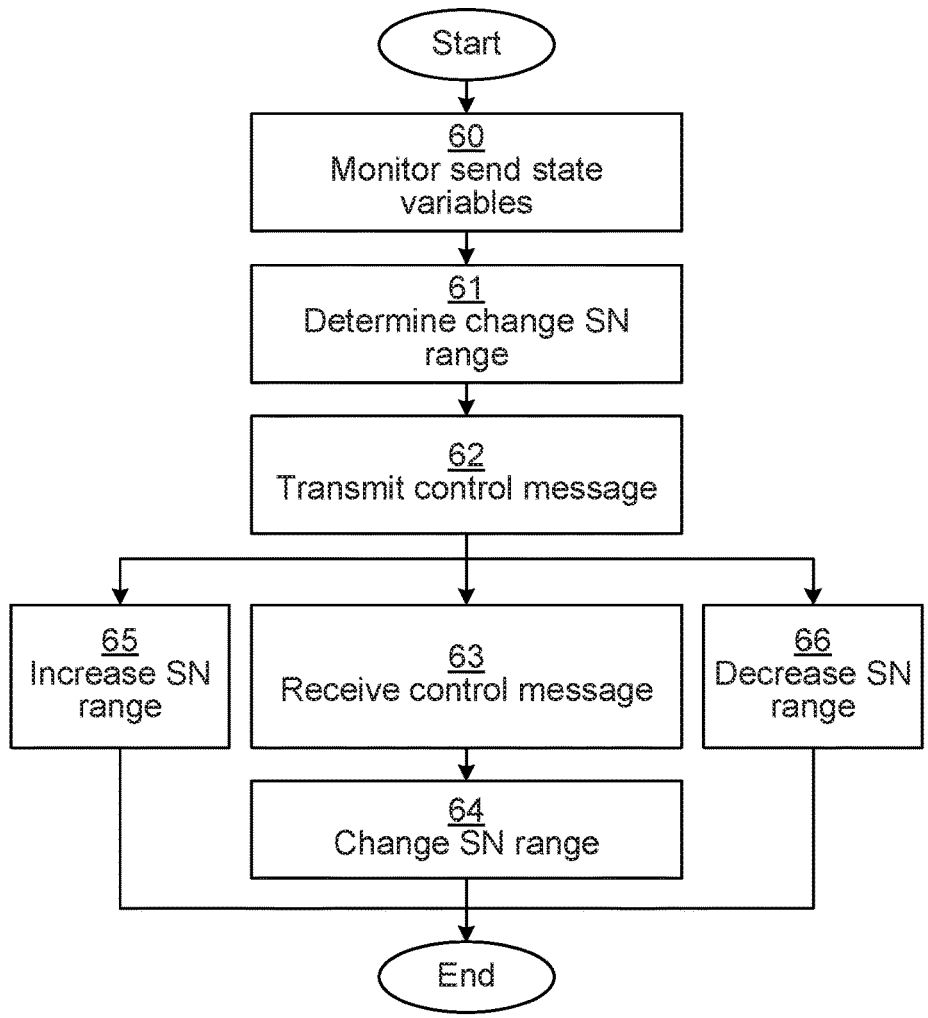

A method, according to an embodiment, for managing a sequence number (SN) range for radio link control (RLC) entities in a radio access network 5 during an on-going connection, is presented with reference to FIGS. 6A-6B, which method is performed in a transmitting node 4. The method comprises, which is illustrated in FIG. 6A, the steps of monitoring 60 send state variables for a transmission window; determining 61 to change the SN range based on the send state variables; and transmitting 62 a control message when the SN range is determined to change.

The step of monitoring may monitor a maximum send state variable (VT(MS)) and a send state variable (VT(S)) and the step of determining may be based on a difference between the VT(MS) and VT(S).

The step of determining may be based on a currently used SN range.

The method may comprise the further steps of increasing 65 the SN range between delivery of a protocol data unit (PDU) with an SN of a maximum send state variable (VT(MS)) reduced by the increase offset (OFFSET_E) and delivery of a PDU with an SN of 0, and decreasing 66 the SN range between delivery of PDU with an SN of VT(MS) reduced by the decrease offset (OFFSET_L) increased by a current transmission window size (AM_Window_Size) and delivery of a PDU with an SN of 0.

The control message may indicate a dedicated SN for performing an RLC reset.

A method, according to an embodiment, for managing a sequence number (SN) range for radio link control (RLC) entities in a radio access network during an on-going connection, is presented with reference to FIG. 6B, the method being performed in a receiving node 4 of the radio access network 5. The method comprises the steps of receiving 63 a control message for change of the SN range and changing 64 the SN range.

A transmitting node 4, according to an embodiment, for managing a sequence number (SN) range for radio link control (RLC) entities in a radio access network 5 during an on-going connection, is presented. The transmitting node 4 comprises: a processor 10, and a computer program product 12, 13 storing instructions that, when executed by the processor 10, causes the transmitting node to: monitor 60 send state variables for a transmission window, determine 61 to change the SN range based on the send state variables, and transmit 62 a control message when the SN range is determined to change.

A receiving node 4, according to an embodiment, for managing a sequence number (SN) range for radio link control (RLC) entities in a radio access network 5 during an on-going connection, is presented. The receiving node 4 comprises: a processor 10, and a computer program product 12, 13 storing instructions that, when executed by the processor 10, causes the receiving node 4 to: receive 63 a control message for change of the SN range, and change 64 the SN range.

Committing to a larger SN range, i.e. changing the SN range, may be made at the earliest at the reception of the PDU with SN=VR(MS)−OFFSET_E and at the latest at the reception of the PDU with SN=0 that follows, i.e. immediately when moving into the entering condition or at least before it is absolutely needed such as when passing the upper end of the SN range at which the SN range wraps around, without restarting a modulus base (VR(A)) thereof, i.e. without resetting the acknowledgement state and receive state variables.

Committing to a smaller SN range, i.e. changing the SN range, may be made at the earliest at the reception of the PDU with SN=VR(MS)−OFFSET_L+ a decreased window size, AM_Window_Size_S, and at the latest at the reception of the next PDU with SN=0 that follows, i.e. as soon as possible after having moved into the leaving condition or at least before it is absolutely needed, such as when passing the upper end of the SN range at which it wraps around, but first allowing a full round of the smaller SN range to occur, thus avoiding duplicate use of the same SN, then restarting a modulus base VR(A) thereof, i.e. resetting acknowledgements and receive state variables thereof.

A transmitting node 4, according to an embodiment, for managing a sequence number (SN) range for radio link control (RLC) entities in a radio access network 5 during an on-going connection, is presented. The transmitting node 4 comprises: a monitoring manager 70 configured to monitor send state variables for a transmission window, a determination manager 71 configured to determine to change the SN range based on the send state variables, and a communication manager 72 configured to transmit a control message when the SN range is determined to change.

A receiving node 4 according to an embodiment, for managing a sequence number (SN) range for radio link control (RLC) entities in a radio access network 5 during an on-going connection, is presented. The receiving node 4 comprises: a communication manager 72 configured to receive a control message for change of the SN range, and configured to change the SN range.

A computer program 14, 15 according to an embodiment, for managing a sequence number (SN) range for radio link control (RLC) entities in a radio access network 5 during an on-going connection, is presented. The computer program 14, 15 comprises computer program code which, when run on a processor 10 of a transmitting node 4 in the radio access network 5, causes the transmitting node to: monitor 60 send state variables for a transmission window, determine 61 to change the SN range based on the send state variables, and transmit 62 a control message when the SN range is determined to change.

A computer program 14, 15, according to an embodiment, for managing a sequence number (SN) range for radio link control (RLC) entities in a radio access network 5 during an on-going connection. The computer program 14, 15 comprises computer program code which, when run on a processor 10 of a receiving node 4 in the radio access network 5, causes the receiving node to: receive 63 a control message for change of the SN range, and change 64 the SN range.

Figure 7:
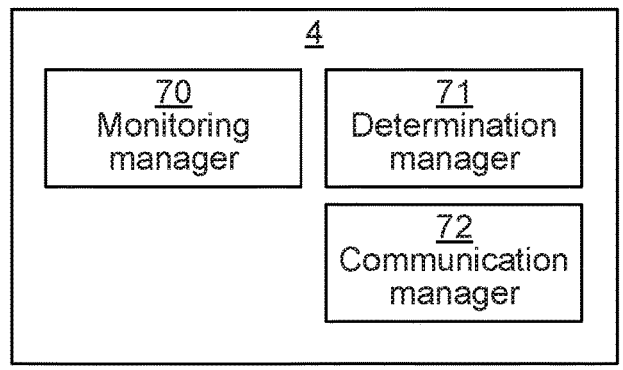
FIG. 7 is a schematic diagram showing functional modules of a node.

FIG. 7 is a schematic diagram showing functional modules of the transmitting node 4, generically numbered 4 for the wireless device 1 or the eNB 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 6A-69, comprising a monitoring manager unit 70, a determination manager 71, and a communication manager unit 72. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The monitoring manager 70 is for monitoring send state variables for a transmission window. This module corresponds to the monitoring step 60 of FIGS. 6A-6B. This module can e.g. be implemented by the processor 10 of FIG. 5, when running the computer program.

The determination manger 71 is for determining to change the SN range based on the send state variables. This module corresponds to the determination step 62 of FIGS. 6A-6B. This module can e.g. be implemented by the processor 10 of FIG. 5, when running the computer program.

The communication manger 72 is for transmitting a control message when the SN range is determined to change, for receiving a control message for change of the SN range, and for changing the SN range. This module corresponds to the transmitting step 62 of FIGS. 6A-6B, the receiving step 63 of FIG. 6B, the changing step 64 of FIG. 6B, the increasing step 65 of FIG. 6B, and the decreasing step 66 of FIG. 6B. This module can e.g. be implemented by the processor 10 of FIG. 5, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for managing a sequence number (SN) range for radio link control (RLC) entities in a radio access network during an on-going connection, the method comprising a transmitting node of the radio access network:
monitoring send state variables for a transmission window;
determining to change the SN range based on the send state variables; and
transmitting a control message when the SN range is determined to change;
wherein an increase offset defines an allowed least size of available transmission window before it is determined to increase the SN range;
wherein a decrease offset defines an allowed greatest size of available transmission window before it is determined to decrease the SN range;
wherein the transmitting comprises sending a control message for increase of the SN range when a difference of the send state variables is below the increase offset;
wherein the transmitting comprises sending a control message for decrease of the SN range when a difference of the send state variables is above the decrease offset.

2. The method of claim 1, wherein
the monitoring comprises monitoring a maximum send state variable (VT(MS)) and a send state variable (VT(S));

the determining is based on a difference between the VT(MS) and the VT(S).

3. The method of claim 1, wherein the determining is based on a currently used SN range.

4. The method of claim 1, wherein the control message is a control protocol data unit (PDU) message.

5. The method of claim 4, wherein the control PDU message is contained in a control PDU type field.

6. The method of claim 1, further comprising:
increasing the SN range between delivery of a protocol data unit (PDU) with an SN of a maximum send state variable (VT(MS)) reduced by the increase offset and delivery of a PDU with an SN of 0; and
decreasing the SN range between delivery of PDU with an SN of VT(MS) reduced by the decrease offset increased by a decreased transmission window size and delivery of a PDU with an SN of 0.

7. The method of claim 1, wherein the step of determining is based on (VT(MS)−VT(S)+(SN range)) MOD (SN range), where (VT(MS)) is a maximum send state variable and (VT(S)) is a send state variable.

8. The method of claim 1, wherein the control message indicates a dedicated SN for performing an RLC reset.

9. The method of claim 1, wherein the SN range is changed between an SN length of 10 and 16 bits.

10. The method of claim 1, wherein the transmitting node is a network node.

11. The method of claim 1, wherein the transmitting node is a wireless device.

12. A method for managing a sequence number (SN) range for radio link control (RLC) entities in a radio access network during an on-going connection, the method comprising a receiving node of the radio access network:
receiving an in-band control message for change of the SN range responsive to a difference between a max send state variable and a current send state variable; and
changing the SN range in accordance with the received control message;
wherein an increase offset defines an allowed least size of available transmission window before it is determined to increase the SN range;
wherein a decrease offset defines an allowed greatest size of available transmission window before it is determined to decrease the SN range;
wherein the receiving comprises receiving a control message for increase of the SN range when a difference of the send state variables is below the increase offset;
wherein the receiving comprises receiving a control message for decrease of the SN range when a difference of the send state variables is above the decrease offset.

13. The method of claim 12, wherein the control message is a control protocol data unit (PDU) message.

14. The method of claim 13, wherein the control PDU message is contained in a control PDU type field.

15. The method of claim 12, wherein the control message indicates a dedicated SN for performing an RLC reset.

16. The method of claim 12, wherein the SN range is changed between an SN length of 10 and 16 bits.

17. The method of claim 12, wherein the receiving node is a network node.

18. The method of claim 12, wherein the receiving node is a wireless device.

19. A transmitting node for managing a sequence number (SN) range for radio link control (RLC) entities in a radio access network during an on-going connection, the transmitting node comprising:
a processor; and
memory containing instructions that, when executed by the processor, whereby the transmitting node is operative to:
monitor send state variables for a transmission window;
determine to change the SN range based on the send state variables; and
transmit a control message when the SN range is determined to change;
wherein an increase offset defines an allowed least size of available transmission window before it is determined to increase the SN range;
wherein a decrease offset defines an allowed greatest size of available transmission window before it is determined to decrease the SN range is determined;
wherein the transmitting comprises sending a control message for increase of the SN range when a difference of the send state variables is below the increase offset; and
wherein the transmitting comprises sending a control message for decrease of the SN range when a difference of the send state variables is above the decrease offset.

20. The transmitting node of claim 19:
wherein the monitoring comprises monitoring a maximum send state variable (VT(MS)) and a send state variable (VT(S));
wherein the determining is based on a difference between the VT(MS) and VT(S).

21. The transmitting node of claim 19, wherein the determining is based on a currently used SN range.

22. The transmitting node of claim 19, wherein the control message is a control protocol data unit (PDU) message.

23. The transmitting node of claim 22, wherein the control PDU message is contained in a control PDU type (CPT) field.

24. The transmitting node of claim 19, wherein the instructions are such that the transmitting node is operative to:
increase the SN range between delivery of a protocol data unit (PDU) with an SN of a maximum send state variable (VT(MS)) reduced by the increase offset and delivery of a PDU with an SN of 0; and
decrease the SN range between delivery of PDU with an SN of VT(MS) reduced by the decrease offset increased by a decreased transmission window size and delivery of a PDU with an SN of 0.

25. The transmitting node of claim 19, wherein the determining is based on (VT(MS)−VT(S)+(SN range)) MOD (SN range), where (VT(MS)) is a maximum send state variable and (VT(S)) is a send state variable.

26. The transmitting node of claim 19, wherein the control message indicates a dedicated SN for performing an RLC reset.

27. The transmitting node of claim 19, wherein the SN range is changed between an SN length of 10 and 16 bits.

28. The transmitting node of claim 19, wherein the transmitting node is a network node.

29. The transmitting node of claim 19, wherein the transmitting node is a wireless device.

30. A receiving node for managing a sequence number (SN) range for radio link control (RLC) entities in a radio access network during an on-going connection, the receiving node comprising:
a processor; and
memory containing instructions that, when executed by the processor, whereby the receiving node is operative to:

receive an in-band control message for change of the SN range responsive to a difference between a max send state variable and a current send state variable; and change the SN range in accordance with the received control message;

wherein an increase offset defines an allowed least size of available transmission window before it is determined to increase the SN range;

wherein a decrease offset defines an allowed greatest size of available transmission window before it is determined to decrease the SN range;

wherein the receiving comprises receiving a control message for increase of the SN range when a difference of the send state variables is below the increase offset;

wherein the receiving comprises receiving a control message for decrease of the SN range when a difference of the send state variables is above the decrease offset.

31. The receiving node of claim 30, wherein the control message is a control protocol data unit (PDU) message.

32. The receiving node of claim 31, wherein the control PDU message is contained in a control PDU type (CPT) field.

33. The receiving node of claim 30, wherein the control message indicates a dedicated SN for performing an RLC reset.

34. The receiving node of claim 30, wherein the SN range is changed between an SN length of 10 and 16 bits.

35. The receiving node of claim 30, wherein the receiving node is a network node.

36. The receiving node of claim 30, wherein the receiving node is a wireless device.

37. A transmitting node for managing a sequence number (SN) range for radio link control (RLC) entities in a radio access network during an on-going connection, the transmitting node comprising:

a processing circuit configured to function as:

a monitoring manager configured to monitor send state variables for a transmission window;

a determination manager configured to determine to change the SN range based on the send state variables; and a communication manager configured to transmit a control message when the SN range is determined to change;

wherein an increase offset defines an allowed least size of available transmission window before it is determined to increase the SN range;

wherein a decrease offset defines an allowed greatest size of available transmission window before it is determined to decrease the SN range;

wherein the transmitting comprises sending a control message for increase of the SN range when a difference of the send state variables is below the increase offset;

wherein the transmitting comprises sending a control message for decrease of the SN range when a difference of the send state variables is above the decrease offset.

38. A receiving node for managing a sequence number (SN) range for radio link control (RLC) entities in a radio access network during an on-going connection, the receiving node comprising:

a processing circuit configured to function as a communication manager configured to:

receive an in-band control message for change of the SN range responsive to a difference between a max send state variable and a current send state variable; and change the SN range in accordance with the received control message;

wherein an increase offset defines an allowed least size of available transmission window before it is determined to increase the SN range;

wherein a decrease offset defines an allowed greatest size of available transmission window before it is determined to decrease the SN range;

wherein the receiving comprises receiving a control message for increase of the SN range when a difference of the send state variables is below the increase offset;

wherein the receiving comprises receiving a control message for decrease of the SN range when a difference of the send state variables is above the decrease offset.

39. A computer program product stored in a non-transitory computer readable medium for managing a sequence number (SN) range for radio link control (RLC) entities in a radio access network during an on-going connection, the computer program product comprising computer program code which, when run on a processor of a transmitting node in the radio access network, causes the transmitting node to:

monitor send state variables for a transmission window;

determine to change the SN range based on the send state variables; and transmit a control message when the SN range is determined to change;

wherein an increase offset defines an allowed least size of available transmission window before it is determined to increase the SN range;

wherein a decrease offset defines an allowed greatest size of available transmission window before it is determined to decrease the SN range;

wherein the transmitting comprises sending a control message for increase of the SN range when a difference of the send state variables is below the increase offset;

wherein the transmitting comprises sending a control message for decrease of the SN range when a difference of the send state variables is above the decrease offset.

40. A computer program product stored in a non-transitory computer readable medium for managing a sequence number (SN) range for radio link control (RLC) entities in a radio access network during an on-going connection, the computer program product comprising computer program code which, when run on a processor of a receiving node in the radio access network, causes the receiving node to:

receive an in-band control message for change of the SN range responsive to a difference between a max send state variable and a current send state variable; and change the SN range in accordance with the received control message;

wherein an increase offset defines an allowed least size of available transmission window before it is determined to increase the SN range;

wherein a decrease offset defines an allowed greatest size of available transmission window before it is determined to decrease the SN range;

wherein the receiving comprises receiving a control message for increase of the SN range when a difference of the send state variables is below the increase offset;

wherein the receiving comprises receiving a control message for decrease of the SN range when a difference of the send state variables is above the decrease offset.

* * * * *